United States Patent
Boening et al.

(10) Patent No.: US 10,001,054 B2
(45) Date of Patent: Jun. 19, 2018

(54) METHOD AND DEVICE FOR ORIENTING AN ACTUATOR OF AN EXHAUST-GAS TURBOCHARGER

(71) Applicant: CONTINENTAL AUTOMOTIVE GMBH, Hannover (DE)

(72) Inventors: Ralf Boening, Reiffelbach (DE); Simon Baensch, Pfakofen (DE); Bruno Ferling, Beindersheim (DE); Dirk Frankenstein, Floersheim-Dalsheim (DE)

(73) Assignee: Continental Automotive GmbH, Hannover (DE)

( * ) Notice: Subject to any disclaimer, the term of this patent is extended or adjusted under 35 U.S.C. 154(b) by 171 days.

(21) Appl. No.: 14/391,723

(22) PCT Filed: Mar. 27, 2013

(86) PCT No.: PCT/EP2013/056624
§ 371 (c)(1),
(2) Date: Oct. 10, 2014

(87) PCT Pub. No.: WO2013/152958
PCT Pub. Date: Oct. 17, 2013

(65) Prior Publication Data
US 2015/0075312 A1    Mar. 19, 2015

(30) Foreign Application Priority Data
Apr. 10, 2012   (DE) .................. 10 2012 205 814

(51) Int. Cl.
*F02B 37/18* (2006.01)
*F01D 17/10* (2006.01)
(Continued)

(52) U.S. Cl.
CPC .......... *F02B 37/186* (2013.01); *F01D 17/105* (2013.01); *F01D 25/28* (2013.01);
(Continued)

(58) Field of Classification Search
CPC ....... F01D 17/105; F01D 25/28; F02M 26/58; F02M 26/65; F02M 26/70; F02M 26/72;
(Continued)

(56) References Cited

U.S. PATENT DOCUMENTS 3,825,148 A * 7/1974 Hunter ............... H01F 27/02
174/17 LF
4,056,043 A * 11/1977 Sriramamurty ......... F15B 15/02
403/131
(Continued)

FOREIGN PATENT DOCUMENTS

CN       1244627 A       2/2000
DE      34 39 986   *   5/1986
(Continued)

*Primary Examiner* — William C Joyce
(74) *Attorney, Agent, or Firm* — Laurence A. Greenberg; Werner H. Stemer; Ralph E. Locher

(57) ABSTRACT

A method and a device for orienting an actuator of an exhaust-gas turbocharger which has an actuator that is equipped with an actuator housing and is connected to a control rod. First, an actuator holder is fastened to the compressor housing of the exhaust-gas turbocharger. Then the actuator is inserted into the actuator holder. Then the actuator is positioned within the actuator holder. Then a compensating material is introduced through an injection opening into a compensating-material receiving space which is provided in the actuator holder. Finally, the compensating material is hardened.

6 Claims, 2 Drawing Sheets

(51) Int. Cl.
*F01D 25/28* (2006.01)
*F15B 15/10* (2006.01)

(52) U.S. Cl.
CPC .......... *F15B 15/10* (2013.01); *F05D 2220/40* (2013.01); *F05D 2230/64* (2013.01); *F05D 2240/91* (2013.01); *F05D 2260/57* (2013.01); *F05D 2260/606* (2013.01); *Y02T 10/144* (2013.01); *Y10T 29/49229* (2015.01); *Y10T 74/20* (2015.01)

(58) Field of Classification Search
CPC ............. F02M 2200/85; F02B 19/1004; F02B 27/0273; F02B 37/168; F02B 37/18; F02B 37/183; F02B 37/186; F02B 41/10; F05D 2220/40; F05D 2230/64; F05D 2230/644; F05D 2240/90; F05D 2240/91; F05D 2260/57; F05D 2260/606; F05D 2230/60; F15B 15/10; F15B 15/202; F15B 15/228; F02C 7/20; F02C 7/32; Y10T 74/20; Y10T 29/49229; Y02T 10/144
USPC ..... 74/469; 251/93, 143, 224, 271, 274, 361
See application file for complete search history.

(56) References Cited

U.S. PATENT DOCUMENTS

| | | | | |
|---|---|---|---|---|
| 4,385,025 A * | 5/1983 | Salerno | ............... | B29C 45/0062 264/255 |
| 5,148,678 A * | 9/1992 | Ueda | ........................ | F02B 37/22 137/338 |
| 5,269,490 A * | 12/1993 | Fujikawa | ............ | B60R 16/0215 137/596.17 |
| 5,746,058 A * | 5/1998 | Vertanen | ............... | F15L 315/10 248/299.1 |
| 5,752,487 A * | 5/1998 | Harrell | ................. | F02M 55/025 123/470 |
| 5,785,024 A * | 7/1998 | Takei | ....................... | F02F 11/00 123/470 |
| 6,105,927 A * | 8/2000 | Zelczer | ................... | F16K 1/221 137/556 |
| 6,178,950 B1 * | 1/2001 | Stockner | ................ | F02M 55/025 123/469 |
| 6,860,467 B2 * | 3/2005 | Yamamoto | .......... | F16K 31/0613 251/129.15 |
| 6,866,026 B2 * | 3/2005 | Mickelson | ............ | F02M 61/14 123/470 |
| 6,883,317 B2 * | 4/2005 | Heath | ................... | F02B 37/186 137/527 |
| 7,191,990 B2 * | 3/2007 | Hutter, III | ............... | B64C 1/406 248/228.3 |
| 7,340,895 B2 * | 3/2008 | Noelle | .................... | F02B 37/24 251/123 |
| 7,347,001 B2 * | 3/2008 | Boge | ..................... | F16B 5/0225 33/568 |
| 7,391,624 B2 * | 6/2008 | Hutter, III | ............... | B64C 1/406 174/138 G |
| 7,677,040 B2 | 3/2010 | McEwan | | |
| 7,800,358 B2 * | 9/2010 | Akiyama | .............. | F02D 11/106 324/207.2 |
| 7,988,106 B2 * | 8/2011 | Carnevali | ............... | B60R 11/00 248/146 |
| 8,057,630 B2 * | 11/2011 | Hermann | ................ | H01M 2/08 156/275.5 |
| 9,435,630 B2 * | 9/2016 | Storrie | .................... | G01D 5/145 |
| 2005/0284995 A1 * | 12/2005 | Hutter, III | ............... | B64C 1/406 248/235 |
| 2007/0271917 A1 | 11/2007 | Vogt | | |
| 2009/0140730 A1 * | 6/2009 | Newman | ................ | G01D 5/145 324/207.24 |
| 2010/0127697 A1 * | 5/2010 | Storrie | .................... | G01D 5/145 324/207.24 |
| 2010/0270486 A1 * | 10/2010 | Kato | ........................ | H02K 7/06 251/129.12 |
| 2010/0282223 A1 * | 11/2010 | Czimmek | .............. | F02M 23/00 123/585 |
| 2010/0288954 A1 * | 11/2010 | Czimmek | .............. | F02B 37/16 251/129.15 |
| 2010/0294966 A1 * | 11/2010 | Czimmek | .............. | F02B 37/16 251/129.15 |
| 2011/0000209 A1 | 1/2011 | Boening et al. | | |
| 2011/0182714 A1 | 7/2011 | Naunheim et al. | | |
| 2011/0262266 A1 * | 10/2011 | Rakoci | .................. | F01D 17/165 415/118 |
| 2012/0216534 A1 | 8/2012 | Werstat et al. | | |
| 2014/0193603 A1 * | 7/2014 | Elgimiabi | ............ | B21D 39/021 428/58 |
| 2014/0241790 A1 * | 8/2014 | Woleader | ............. | F16B 11/006 403/270 |
| 2015/0318196 A1 * | 11/2015 | Fukuda | ............. | H01L 21/67379 206/454 |

FOREIGN PATENT DOCUMENTS

| | | | |
|---|---|---|---|
| DE | 4040760 A1 | 6/1991 | |
| DE | 202008003005 U1 | 5/2008 | |
| DE | 102010005491 A1 | 7/2011 | |
| EP | 0774587 A1 | 5/1997 | |
| WO | 2009106161 A1 | 9/2009 | |
| WO | 2011026471 A1 | 3/2011 | |
| WO | WO 2015138184 A1 * | 9/2015 | ............ F02B 37/186 |

* cited by examiner

METHOD AND DEVICE FOR ORIENTING AN ACTUATOR OF AN EXHAUST-GAS TURBOCHARGER

BACKGROUND OF THE INVENTION

Field of the Invention

The invention relates to a method and a device for orienting an actuator of an exhaust-gas turbocharger.

Exhaust-gas turbochargers serve in general to improve the degree of efficiency of an internal combustion engine and therefore to increase its performance. To this end, the exhaust-gas turbocharger has a turbine which is arranged in the exhaust-gas mass flow of a connected internal combustion engine, and also has a compressor. The turbine wheel of the turbine and the compressor impeller of the compressor are arranged on a common shaft. During operation, the turbine wheel is driven via the exhaust-gas mass flow of the connected internal combustion engine and in turn drives the compressor impeller. The compressor compresses air which is sucked in and feeds said air to the internal combustion engine. The shaft is mounted in a bearing housing of the exhaust-gas turbocharger. Furthermore, the turbine wheel is arranged in a turbine housing and the compressor impeller is arranged in a compressor housing.

On their turbine side, many exhaust-gas turbochargers have what is known as a wastegate system which is used to guide part of the exhaust gas past the turbine wheel if required. Said wastegate system which is often also called a bypass system has a wastegate flap on or in the turbine housing, which wastegate flap can be closed or opened using a control rod. For example, one end region of the control rod is connected to an actuator, for example a lever. The other end region of the control rod is mounted in an actuator and is connected to a diaphragm there. Said actuator is usually a pressure sensor which is fastened to the compressor housing. The diaphragm is in contact with a pressure chamber. As a result of a change in the pressure in the pressure chamber, the diaphragm acts on a spring which surrounds the control rod and, as a result, is compressed or relieved. As a consequence, the control rod which is connected to the diaphragm is also moved in the axial direction and opens or closes the wastegate channel depending on requirements on account of its coupling to the lever or the flap.

Before an exhaust-gas turbocharger is started up, the actuator must be fastened to the exhaust-gas turbocharger, preferably to the compressor housing thereof, and subsequently the actuator must be oriented in such a way that it can move the control rod in the desired way during operation of the exhaust-gas turbocharger, in order to ensure that the wastegate channel can be completely closed or opened to a greater or lesser extent in the desired way.

It is already known to fasten the actuator or its housing to the compressor housing, for example to screw it to the latter, and subsequently to perform the necessary orientation of the control rod relative to the actuator. For this purpose, it is necessary to move the control rod in the actuator housing, which is associated firstly with undesired deformation and loading of the diaphragm and, furthermore, presupposes that there is sufficient clearance in that region of the actuator housing, in which the control rod is guided out of the actuator housing, in order to make the necessary movement of the control rod possible.

BRIEF SUMMARY OF THE INVENTION

It is the object of the invention to specify a method and a device, in which the above-described disadvantages are reduced.

This object is achieved by way of a method having the features which are specified in claim 1 and by way of a device having the features which are specified in claim 3. Advantageous refinements and developments of the invention are specified in the dependent claims.

A device according to the invention has a compensating-material receiving space which is filled or can be filled with a compensating material, and into which compensating material is introduced after orientation of the control rod and the actuator which is connected to the control rod, in such a way that the desired orientation of the actuator and the control rod relative to the actuator is set in a fixed manner after hardening of the compensating material. Afterward, the actuator which is connected to the control rod can be opened or closed in the respectively desired way by way of the control rod which moves in its axial direction as a result of a change in the pressure in the pressure chamber of the actuator.

BRIEF DESCRIPTION OF THE SEVERAL VIEWS OF THE DRAWINGS

Further advantageous properties of the invention result from the following explanation thereof using the figures, in which.

DESCRIPTION OF THE INVENTION

Figure 1:
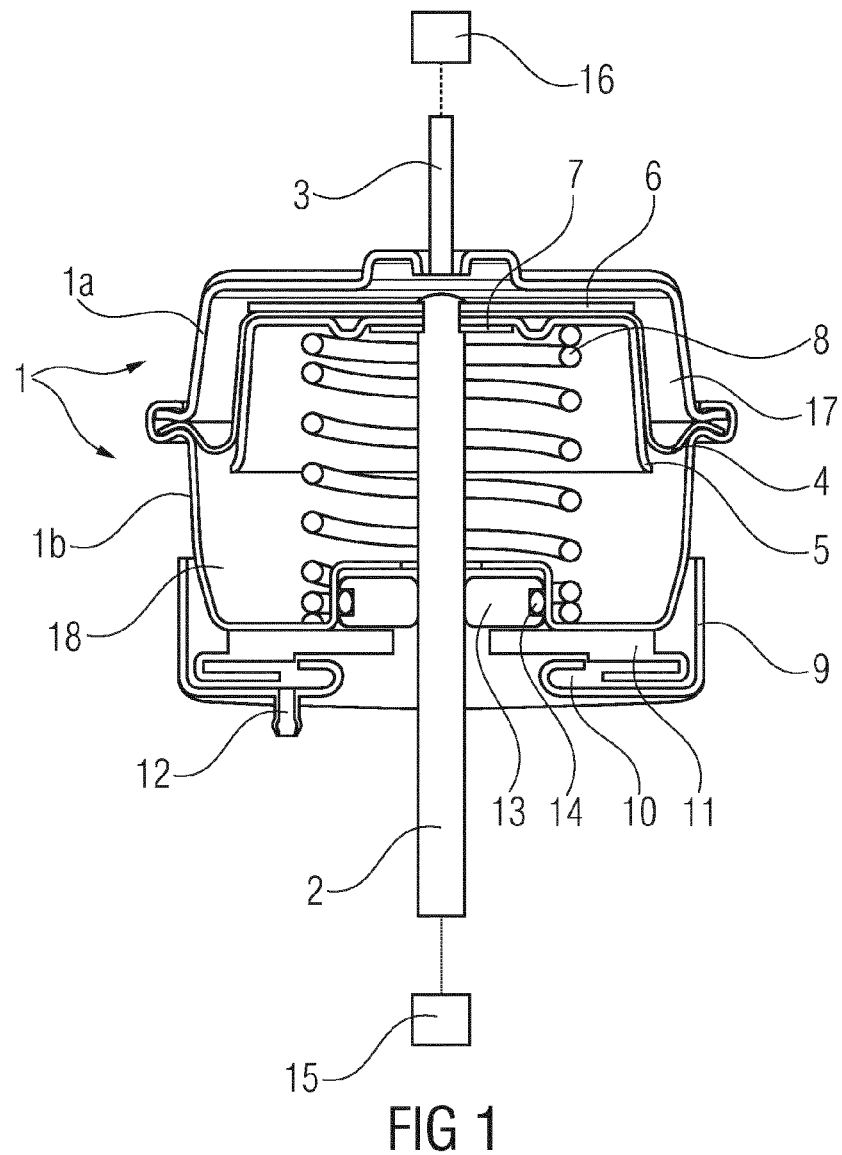
FIG. 1 shows a sectional illustration of the component parts of a device according to one exemplary embodiment of the invention which are necessary for the comprehension of the invention.

The device which is shown in FIG. 1 has an actuator 1 which is a pressure sensor. Said pressure sensor has a cover 1a and a lower part 1b which are connected fixedly to one another and form the actuator housing. A diaphragm 4 is clamped in the interior of the actuator housing between the cover and the lower part, which diaphragm 4 passes through the entire actuator housing in the horizontal direction and divides the latter into an upper chamber 17 and a lower chamber 18. The upper chamber 17 is a pressure chamber which is connected to a compressed air line 3 which for its part is in contact with a compressed air source 16.

A spring 8 which surrounds the control rod 2 which protrudes from below into the actuator housing is provided in the lower chamber 18 of the actuator housing. If compressed air is introduced via the compressed air feed line 3 into the pressure chamber, the pressure chamber is enlarged, the spring 8 which is provided in the lower chamber 18 being compressed and the control rod which is fastened to the diaphragm 4 being moved downward in its axial direction in FIG. 1, in order to act on the actuator 15 in the desired way. A supporting part 5 which is arranged below the diaphragm 4 and a disk 6 which is provided above the diaphragm 4 are provided in order to support the diaphragm 4. Furthermore, a further disk 7 is provided which surrounds the control rod 2 annually in the vicinity of the upper end region of said control rod 2 and is positioned on a step of the control rod 2.

The lower end region of the spring 8 is placed onto the lower part 1b of the actuator housing. In its region which lies radially on the inside, the lower part 1b is in contact with the control rod 2 via a guide element 13, the guide element 13 being equipped with a sealing ring 14 in its radial outer region.

A counterholder 11 which surrounds the control rod 2 annularly but is spaced apart from it is fastened to the underside of the lower part 1b.

The actuator with the counterholder 11 which is fastened to the underside of its lower part 1b is inserted into an actuator holder 9 which is shaped in its lower region in such a way that a compensating-material receiving space 10 which likewise surrounds the control rod 2 annularly and is likewise spaced apart from it is provided between the actuator holder 9 and the counterholder 11, which compensating-material receiving space 10 has an injection opening 12 which is accessible from below. Compensating material can be injected into said injection opening 12 with the use of a nipple. Said compensating material is preferably polymer resin which is injected in the liquid state through the injection opening into the compensating-material receiving space and then hardens or solidifies there.

A different material which has comparable properties can also be used instead of polymer resin as the compensating material.

Figure 2:
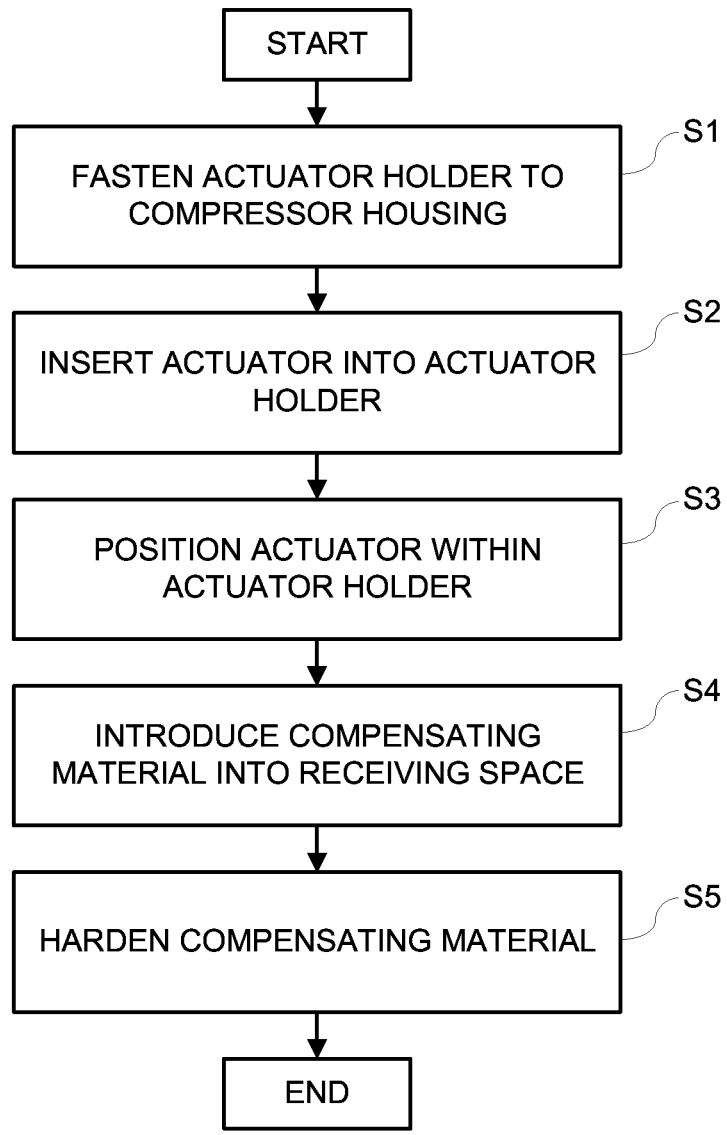
FIG. 2 shows a flow diagram for illustrating a method according to the invention.

The fastening of the actuator and its orientation are performed according to a method which will be explained in the following text using the flow diagram which is shown in FIG. 2.

In a first step S1, the actuator holder 9 is fastened to the compressor housing of the exhaust-gas turbocharger, for example is screwed to said compressor housing. In a second step S2 which follows, the actuator 1 including the control rod 2 which is connected to the actuator 1 is inserted into the actuator holder 9, the control rod 2 passing out of the actuator holder through an opening in the bottom region of the actuator holder 9. After said insertion of the actuator 1 into the actuator holder 9, the actuator 1 or its housing is first of all mounted movably in the actuator holder 9.

In a third step S3, positioning of the actuator 1 or the actuator housing within the actuator holder 9 then takes place in such a way that the desired orientation of the control rod 2 and therefore of the actuator housing relative to the actuator 15 exists. During said positioning, a relative movement between the diaphragm 4 and the control rod 2 is advantageously not necessary, in contrast to the prior art. As a consequence, undesired deformation of the diaphragm also does not take place during said orientation.

When the desired orientation has been set, the compensating material is introduced through the injection opening 12 in a fourth step S4, with the result that the compensating-material receiving space 10 is filled in its present orientation with polymer resin or a comparable compensating material.

When the compensating material has been introduced into the compensating-material receiving space 10, waiting is carried out in a fifth step S5 until the compensating material has hardened. The positioning of the actuator or the actuator housing relative to the actuator is then ended and, if required, an additional mechanical securing means can be attached, for example by way of screwing or wedging.

In the procedure according to the invention, setting of the actuator on the control rod can advantageously be dispensed with. As a result, undesired loading and deformation of the diaphragm which is provided in the actuator are avoided. Furthermore, in said procedure, the control rod and the actuator housing can be oriented precisely relative to the actuator holder, without it being necessary for the control rod to be moved relative to the diaphragm in order to compensate for tolerances. Furthermore, if further force transmission parts are present, the tolerances can be increased, which as a rule leads to a reduction of costs.

The invention claimed is:

1. A device for orienting an actuator of an exhaust-gas turbocharger, comprising:
   an actuator provided with an actuator housing;
   a control rod connected to said actuator;
   an actuator holder disposed to support said actuator housing with a spacing distance between said actuator housing and said actuator holder forming a compensating-material receiving space between said actuator holder and said actuator housing;
   said compensating-material receiving space being formed to extend annularly around said control rod and an end region of said compensating-material receiving space radially inside being spaced apart from said control rod; and
   a compensating-material injected into and hardened in said compensating-material receiving space to compensate an actuator displacement in a direction of the rod axis.

2. The device according to claim 1, wherein said actuator housing has a cover and a lower part, said spacing distance formed between said actuator housing and actuator holder being formed at said lower part of said actuator housing, and said compensating-material receiving space is formed between said lower part of said actuator housing and said actuator holder.

3. The device according to claim 2, wherein said lower part of said actuator housing includes a bottom part and a counterholder disposed between said actuator housing and said actuator holder and fastened to said bottom part of said actuator housing, and wherein said compensating-material receiving space is formed between said counterholder and said actuator holder.

4. The device according to claim 1, wherein said compensating-material receiving space has an injection opening.

5. The device according to claim 1, wherein the compensating material is a polymer resin.

6. The device according to claim 1, wherein a position of said actuator in said actuator holder can be changed when said compensating-material receiving space has not yet been injected with the compensating material and the position is fixed after the compensating-material receiving space is injected with the compensating material and the compensating material has hardened.

\* \* \* \* \*